United States Patent
Lee et al.

(10) Patent No.: US 9,881,414 B2
(45) Date of Patent: Jan. 30, 2018

(54) ELECTRONIC DEVICE AND METHOD FOR DISPLAYING OVERLAPPING OBJECTS

(71) Applicant: Samsung Electronics Co., Ltd., Gyeonggi-do (KR)

(72) Inventors: Jae-Myoung Lee, Seoul (KR); Kyung-Dae Park, Seoul (KR); Jee-Yeun Wang, Seoul (KR); Ho-Young Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/012,012

(22) Filed: Feb. 1, 2016

(65) Prior Publication Data

US 2016/0225183 A1   Aug. 4, 2016

(30) Foreign Application Priority Data

Jan. 30, 2015   (KR) .......................... 10-2015-0015181

(51) Int. Cl.
*G06T 15/60* (2006.01)
*G06T 11/00* (2006.01)

(52) U.S. Cl.
CPC ............ *G06T 15/60* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 2008/0316145 A1* | 12/2008 | May | G06T 15/60 345/7 |
| 2013/0072302 A1* | 3/2013 | Suzuta | A63F 13/04 463/4 |
| 2014/0306980 A1 | 10/2014 | Won et al. | |
| 2015/0220230 A1 | 8/2015 | Kim et al. | |

FOREIGN PATENT DOCUMENTS

| | | |
|---|---|---|
| KR | 1020120040898 | 4/2012 |
| KR | 1020130075344 | 7/2013 |
| KR | 1020140122458 | 10/2014 |

OTHER PUBLICATIONS

Rose, "4 Ways to Create Long Shadow Effects in Photoshop", Oct. 1, 2013, retrieved from https://design.tutsplus.com/tutorials/4-ways-to-create-long-shadow-effects-in-photoshop--ps on Mar. 1, 2017.*
Unknown, "DV Digital-Analog Transfer Curve," archived at http://web.archive.org/web/20000301045930/http://www.bealecorner.com/trv900/tech/trans/dvtrans.html on Mar. 1, 2000.*

* cited by examiner

*Primary Examiner* — Zhengxi Liu
(74) *Attorney, Agent, or Firm* — The Farrell Law Firm, P.C.

(57) ABSTRACT

Disclosed is a method for displaying an object by an electronic device. The method for displaying an object includes overlapping a plurality of second objects obtained by changing an attribute of a first object in a direction corresponding to the location of a light source, displaying the plurality of overlapping second objects and displaying the first object on the plurality of overlapping second objects.

18 Claims, 16 Drawing Sheets

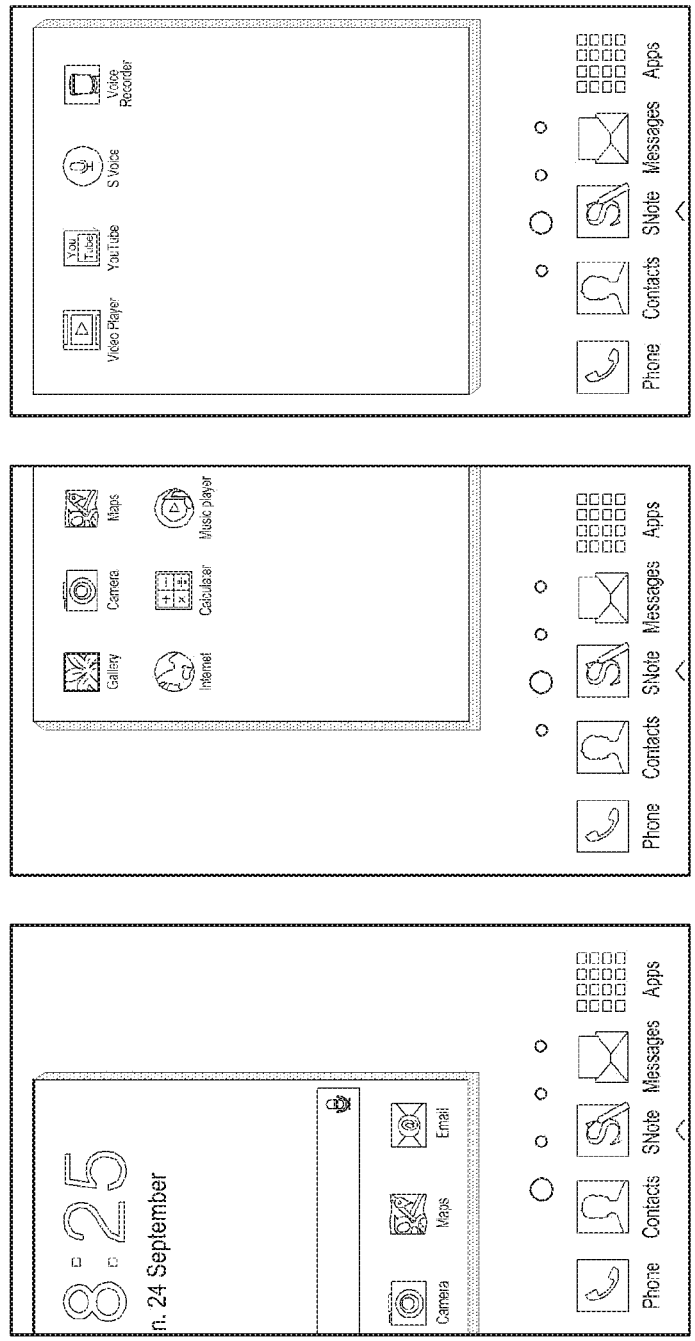

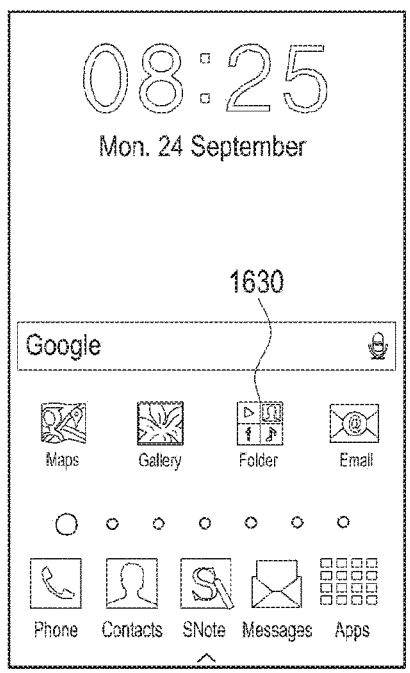
FIG.16C
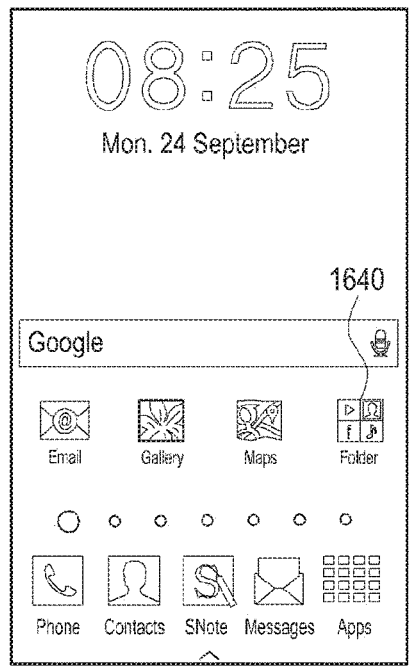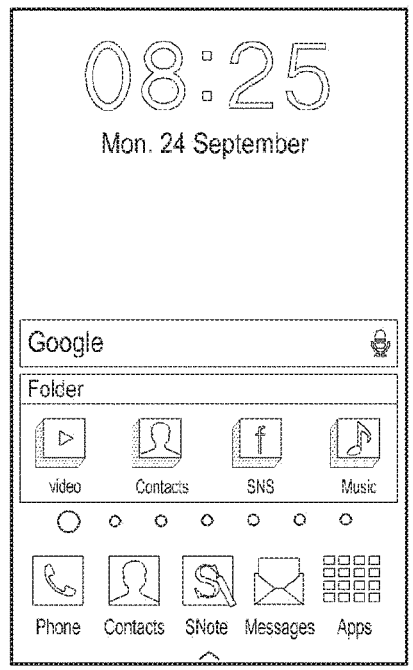
FIG.16D

ELECTRONIC DEVICE AND METHOD FOR DISPLAYING OVERLAPPING OBJECTS

PRIORITY

This application claims priority under 35 U.S.C. § 119(a) to Korean Patent Application Serial No. 10-2015-0015181, filed on Jan. 30, 2015, the entire content of which is incorporated herein by reference.

BACKGROUND

1. Field of the Disclosure

The present disclosure relates to a method for displaying an object through a display in an electronic device.

2. Description of the Related Art

In recent years, electronic devices, such as smartphones, tablet PCs, Personal Digital Assistants (PDAs), and navigation systems, have been increasingly used, and various services and functions have been developed and applied thereto.

In the development of the above-described electronic devices, the designs of graphical objects that are visual elements such as background screens, icons, widgets, menus, and texts which are displayed on screens, are also considered important along with the external design of the electronic devices due to the consumer trend of increasing design importance. Further, the graphical objects displayed on the electronic devices may be displayed 3-dimensionally, or the shadows of the graphical objects may be displayed such that the graphical objects are expressed more realistically. Therefore, users may experience the graphical objects displayed on the electronic device more realistically.

An electronic device may display a shadow of an object displayed through a display. In this case, the electronic device displays a shadow similar to the shape of the object on a display in consideration of the location of a light source.

SUMMARY

Accordingly, an aspect of the present disclosure provides a method for displaying second objects corresponding to a first object displayed on a display of an electronic device such that the second objects overlap each other and displaying the first object on the overlapping second objects. Accordingly, the electronic device may provide a shadow effect for the first object on the display. Another aspect of the present disclosure provides an electronic device which displays second objects corresponding to a first object displayed through a display of the electronic device such that the second objects overlap each other, and displays the first object on the overlapping second objects. Accordingly, the electronic device may provide a shadow effect for the first object on the display.

Another aspect of the present disclosure provides an electronic device which provides a more realistic shadow effect. In addition, a user may be provided with a more realistic environment by providing a shadow effect for an object based on a location of a light source that is set according to time information, a widget screen and the like.

In accordance with an aspect of the present disclosure, a method for displaying an object by an electronic device is provided, the method including overlapping a plurality of second objects obtained by changing an attribute of a first object in a direction corresponding to a location of a light source, displaying the plurality of overlapping second objects and displaying the first object on the plurality of overlapping second objects.

In accordance with another aspect of the present disclosure, an electronic device is provided which includes a display and a processor that performs control to overlap a plurality of second objects obtained by changing an attribute of a first object in a direction corresponding to a location of a light source, displays the plurality of overlapping second objects and displays the first object on the plurality of overlapping second objects.

In accordance with another aspect of the present disclosure, a method is provided for displaying an object by an electronic device, the method including overlapping a plurality of second objects obtained by changing an attribute of a first object in a direction corresponding to acquired time information, displaying the plurality of overlapping second objects and displaying the first object on the plurality of overlapping second objects.

BRIEF DESCRIPTION OF THE DRAWINGS

The above and other aspects, features, and advantages of the present disclosure will be more apparent from the following detailed description taken in conjunction with the accompanying drawings, in which:

FIGS. 15A to 15C are views illustrating a method for displaying an object in a screen conversion process by an electronic device according to an embodiment of the present disclosure;

FIGS. 16A to 16D are views illustrating a method for displaying an object in a home folder by an electronic device according to an embodiment of the present disclosure.

DETAILED DESCRIPTION

Figure 1:
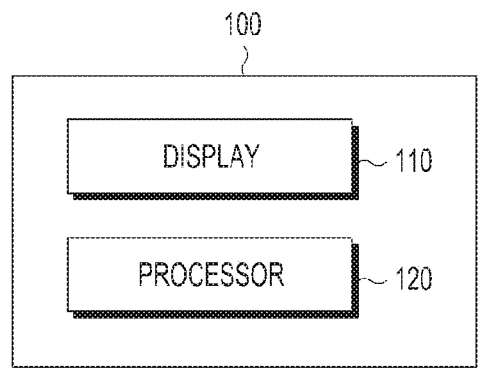
FIG. 1 illustrates a block diagram of an electronic device for displaying an object according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component) and do not exclude one or more additional features.

In the present disclosure, the expressions "A or B", "at least one of A or/and B", or "one or more of A or/and B" may include all possible combinations of the items listed. For example, the expressions "A or B", "at least one of A and B" or "at least one of A or B" refer to all of (1) including at least one A, (2) including at least one B, or (3) including all of at least one A and at least one B.

The expressions "a first", "a second", "the first" or "the second" used in describing various embodiments of the present disclosure may modify various components regardless of the order and/or the importance but do not limit the corresponding components. The above expressions are used merely for the purpose of distinguishing an element from the other elements. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected" or "coupled" to another element (e.g., second element), it may be directly connected or directly coupled to the other element or any other element (e.g., third element) may be interposed between them. In contrast, it is understood that when an element (e.g., first element) is referred to as being "directly connected" or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to" or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B and C" may mean a dedicated processor (e.g. embedded processor) only for performing the corresponding operations or a general purpose processor (e.g., central processing unit (CPU) or application processor (AP)) that can perform the corresponding operations by executing one or more software programs stored in a memory device.

The terms used herein are merely for the purpose of describing particular embodiments and do not limit the scope of other embodiments. As used herein, singular forms may include plural forms as well unless the context clearly indicates otherwise. Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the same meanings as the contextual meanings in the relevant field of the art and are not to be interpreted to have ideal or excessively formal meanings unless clearly defined in the present disclosure. In some cases, even terms defined in the present disclosure should not be interpreted to exclude embodiments of the present disclosure.

For example, an electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera and a wearable device (e.g., a head-mounted-device (HMD) such as electronic glasses, electronic clothes, an electronic bracelet, an electronic necklace, an electronic appcessory, electronic tattoos, or a smart watch).

According to some embodiments of the present disclosure, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device for a ship (e.g., a navigation device for a ship, a gyro-compass), avionics, security devices, an automotive head unit, a robot for home or industry, an automatic teller machine (ATM) in banks, a point of sales (POS) terminal in a shop or Internet of Things device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector and various kinds of measuring instruments (e.g., a water meter, an electric meter, a gas meter and a radio wave meter). In various embodiments of the present disclosure, the electronic device may be a combination of one or more of the aforementioned various devices. The electronic device according to some embodiments of the present disclosure may be a flexible device. Further, the electronic device according to an embodiment of the present disclosure is not limited to the aforementioned devices and may include a new electronic device according to the development of new technologies.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a block diagram of an electronic device 100 for displaying an object according to various embodiments of the present disclosure. Referring to FIG. 1, the electronic device 100 includes a display 110 and a processor 120. The display 110 and the processor 120 of the electronic device 100 may be connected to each other through a bus. The bus may include a circuit that delivers communications (for example, control messages and/or data) between components.

The display 110 may be a unit that may display various content (for example, texts, images, videos, icons, or symbols) to the user. The display 110 may include a liquid crystal display (LCD), a light emitting diode (LED) display, an organic light emitting diode (OLED) display, a micro electromechanical system (MEMS) display and an electronic paper display. The display 110 may include a touch screen and may receive, for example, a touch, a gesture, a proximity, or a hovering input using an electronic pen or a portion of the user's body.

The processor 120 may include one or more of a Central Processing Unit (CPU), an Application Processor (AP), and a Communication Processor (CP). The processor 120, for example, may execute operations or data processing related to the control and/or communication of at least one other component of the electronic device 100.

According to various embodiments of the present disclosure, all or some of the operations executed by the electronic device 100 may be executed by another, or a plurality of, electronic devices or servers. When the electronic device 100 should execute functions or services automatically or upon request, it may request at least some functions associated with the functions or services from another device (for example, another or a plurality of electronic devices or servers), instead of, or in addition to, directly executing the functions or services. The other device may execute a requested function or an additional function, and may deliver the result to the electronic device 100. The electronic device 100 may process the received result directly or additionally, and may provide a requested function or service. To this end, for example, cloud computing, distributed computing or client-server computing technologies may be used.

The processor 120 may perform control to display a plurality of second objects obtained by changing an attribute of a first object such that the plurality of second objects overlap each other in a direction corresponding to the location of a light source on the display 110. For example, the first object may be various content (for example, texts, images, videos, icons, or symbols) displayed on the display 110.

In an embodiment of the present disclosure, the second objects may be objects obtained by changing the attribute of the first object. The second objects may correspond to the shape of the first object, and may be objects obtained by changing the color of the first object. For example, the first object represents a text of 'A' of a white color, and the second objects may represent a text of 'A' of an achromatic color. In this case, the second objects may be objects that have the same shape as that of the first object but have a color that is different from that of the first object. The processor 120 may overlap the plurality of second objects obtained by changing the attribute of the first object and may perform control to display the plurality of overlapping second objects so that a shadow effect for the first object may be provided on the display 110.

According to an embodiment of the present disclosure, the light source may be a light source that may be sensed through an illumination intensity sensor of the electronic device 100 and may be a virtual light source that is set by the electronic device 100. The light source may be a virtual light source that is different from an actual light source sensed through an illumination intensity sensor and the like of the electronic device 100. The light source may be displayed on the display 110 or may function only as a reference for setting a direction in which the plurality of second objects overlap each other and are displayed and may not be displayed on the display 110.

In an embodiment of the present disclosure, the processor 120 may overlap the plurality of second objects obtained by changing the attribute of the first object in a direction corresponding to the acquired time information and display the plurality of overlapping second objects. The processor 120 may set a light source, may overlap the plurality of second objects in a direction corresponding to the set light source to display the plurality of overlapping second objects or may overlap the plurality of second objects in a direction corresponding to the acquired time information without setting the light source to display the plurality of overlapping second objects.

In an embodiment of the present disclosure, the processor 120 may overlap the plurality of second objects at a preset interval. As the number of the overlapping second objects gradually increases, the processor 120 may increase the interval to overlap the plurality of second objects. Furthermore, the processor 120 may set an interval at which the plurality of second objects overlap each other according to selection by the user. Because the expressed shadow effects are different according to the intervals at which the plurality of second objects overlap each other, the user may select an interval at which the plurality of second objects overlap each other such that a shadow effect desired by the user is displayed.

According to various embodiments of the present disclosure, the processor 120 may perform control to display the first object on the plurality of overlapping second objects. The processor 120 may display a shadow effect for the first object by performing control to display the first object on the overlapping second objects.

Accordingly, the processor 120 may provide the user with a more realistic shadow effect by performing control to display the plurality of second objects obtained by changing the attribute of the first object without displaying a shadow effect by displaying an object obtained simply by projecting the first object.

In an embodiment of the present disclosure, the processor 120 may set the location of the light source and the number of second objects, based on the acquired time information. For example, the processor 120 may set the location of the light source based on the time information such that the location of the light source corresponds to the location of the sun according to the time. The processor 120 may allow the direction of the shadow, which is displayed due to the plurality of second objects, to be changed according to the acquired time information by overlapping the plurality of second objects in a direction corresponding to the set location of the light source to display the plurality of overlapping objects. Further, the processor 120 may adjust the length of the shadow displayed due to the plurality of overlapping second objects by setting the number of second objects according to the time information.

In an embodiment of the present disclosure, the time information may include season information based on date information. For example, when the date information indicates August, the season information may indicate summer and when the date information indicates December, the season information may indicate winter. Furthermore, the processor 120 may acquire season information based on the date information, on the basis of the location information acquired through the electronic device 100. For example, when the electronic device 100 is situated in the northern hemisphere or is situated in the southern hemisphere, the season information may be differently acquired even if it is based on the same date information. Further, the processor 120 may set the location of the light source based on the season information. For example, the processor 120 may set the location of the light source in consideration of the fact that the sun's altitude changes according to the seasons.

In an embodiment of the present disclosure, the location of the light source may be set according to the one or more widget screens. The processor 120 may overlap the plurality of second objects in different directions according to the widget screens by setting the location of the light source according to the one or more widget screens. Accordingly, the processor 120 may display the direction of the shadows differently due to the plurality of overlapping second objects according to the widget screens.

In an embodiment of the present disclosure, the plurality of overlapping second objects may be blurred and displayed based on the direction corresponding to the location of the light source. The processor 120 may smooth the borders of the overlapping second objects by blurring the plurality of overlapping second objects based on a direction corresponding to the location of the light source. Furthermore, the processor 120 may blur the plurality of overlapping second objects in a direction corresponding to the location of the light source. For example, the processor 120 may perform control to display the shadow displayed due to the plurality of overlapping second objects on the display 110 more realistically by directionally blurring the plurality of second objects.

In an embodiment of the present disclosure, the processor 120 may differentially change the attributes of the plurality of second objects based on the distances between the first object and the plurality of second objects. The processor 120 may increase the change in degree of the attributes of the second objects as the distances between the first object and the second objects increase. For example, the processor 120 may further decrease the chroma, the brightness, and the like of the plurality of second objects or further increase the transparency of the second objects as the distance between the first object and the second objects increase. Accordingly, the processor 120 may perform control to display the shadow displayed due to the plurality of overlapping second objects on the display 110 more realistically by increasing the change in degree of the attributes of the second objects as the distances between the first object and the second objects increase.

In an embodiment of the present disclosure, the processor 120 may change the attribute of the background screen corresponding to the first object to display the background screen on the display 110, based on the location of the light source. For example, when the location of the light source is situated on the lower side of the first object, the background screen may be displayed darker, and when the light source is situated on the upper side of the first object, the background screen may be displayed brighter. Furthermore, the processor 120 may set the colors of the background screen for the locations of the light source and may change the color to a color set in correspondence to the corresponding location of the light source.

Further, the processor 120 may change the attribute of the background screen such that the attribute of the background screen corresponds to time information used for setting the location of the light source. When the time information indicates a nighttime zone, the background screen may be displayed darker, and when the time information indicates a daytime zone, the background screen may be displayed brighter. Furthermore, the background screen may be changed to a color set in advance according to time information to be displayed. Further, the processor 120 may change the attribute of the background screen based on season information included in the date information. For example, the processor 120 may display an image for the season indicated by the season information through the background screen.

In an embodiment of the present disclosure, the processor 120 may change the background screen that is being currently displayed to a preset background screen according to the time information and may perform control to display the changed background screen on the display 110.

Furthermore, the processor 120 may change the attribute of the background screen corresponding to the first object based on the acquired time information to display the background screen without considering the location of the light source.

In an embodiment of the present disclosure, when the acquired time information corresponds to time information set such that the plurality of second objects are not displayed, the processor 120 may perform control to stop displaying the plurality of overlapping second objects. In order to display the shadow more realistically, the processor 120 may force the shadow not to be displayed in the nighttime zone. For example, when the acquired time information corresponds to a nighttime zone (for example, from 19:00 hour to 06:00 hour of the next day), the processor 120 may perform control such that the second objects are not displayed.

In this case, when the acquired time information corresponds to the nighttime zone while the plurality of second objects are displayed, the processor 120 may perform control to stop displaying the plurality of overlapping second objects. Further, when the plurality of second objects are not displayed, the processor 120 may first determine whether the plurality of second objects will be displayed, and may decide whether the plurality of second objects will be displayed based on the determination result.

While it has been described that the time information set such that the plurality of second objects are not displayed indicates a nighttime zone, it is only for the purpose of description and the present disclosure is not limited thereto. The time information set such that the plurality of second objects are not displayed may be directly set by the user.

In an embodiment of the present disclosure, when the execution of an application corresponding to the first object is stopped, the processor 120 may perform control to stop displaying the plurality of overlapping second objects. When the application corresponding to the first object is executed, the processor 120 may provide a shadow effect by displaying the plurality of overlapping second objects. When the execution of the application is stopped while the application corresponding to the first object is executed and the plurality of overlapping objects are displayed, the processor 120 may perform control to stop displaying the plurality of overlapping second objects.

Figure 2:
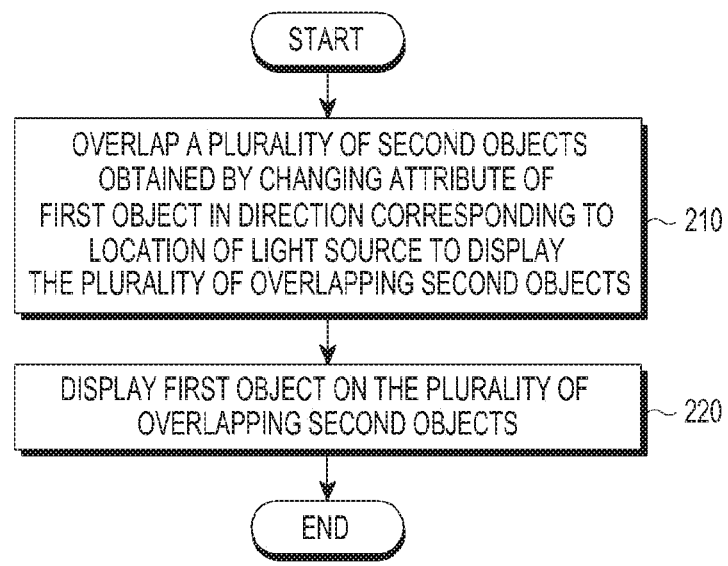
FIG. 2 is a flowchart of a method for displaying an object according to various embodiments of the present disclosure.

FIG. 2 is a flowchart of a method for displaying an object according to various embodiments of the present disclosure.

In step 210, the electronic device 100 may overlap the plurality of second objects obtained by changing the attribute of the first object in a direction corresponding to the location of the light source to display the plurality of overlapping second objects. The second objects may correspond to the shape of the first object and may be objects obtained by changing the color of the first object.

Furthermore, the electronic device 100 may overlap the plurality of second objects obtained by changing the attribute of the first object in a direction corresponding to the acquired time information and display the plurality of overlapping second objects. The time information may be acquired by the electronic device 100 through another electronic device or server, or may be acquired directly by a clock of the electronic device 100. Accordingly, the electronic device 100 may overlap the plurality of second objects in a direction corresponding to the acquired time information to display the plurality of overlapping second objects without setting the light source.

In step 220, the electronic device 100 displays the first object on the plurality of overlapping second objects. The electronic device 100 may allow the shadow effect for the first object to be displayed by displaying the first object on the plurality of second objects obtained by changing the attribute of the first object.

Figure 3:
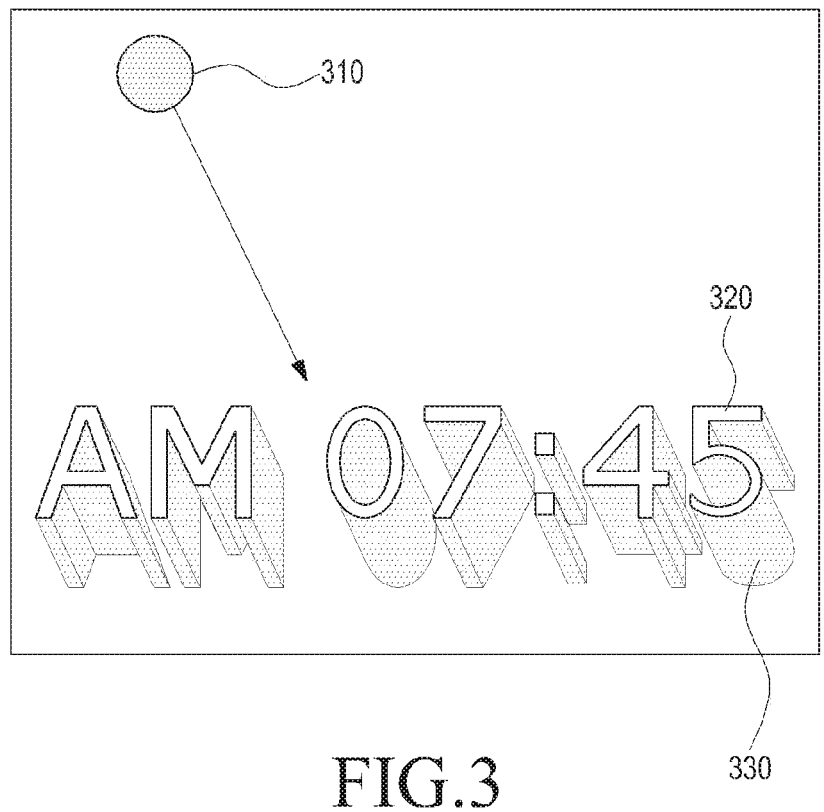
FIG. 3 is a view illustrating a method for displaying an object by an electronic device according to an embodiment of the present disclosure.

FIG. 3 is a view illustrating a method for displaying an object by an electronic device according to an embodiment of the present disclosure.

As illustrated in FIG. 3, the electronic device 100 overlaps the plurality of second objects 330 obtained by changing the attribute of the first object 320 in a direction corresponding to the light source 310 to display the plurality of overlapping second objects 330 and may display the first object 320 on the plurality of overlapping second objects 330.

The light source 310 may be a virtual light source. The light source may be a light source that may be sensed through an illumination intensity sensor of the electronic device 100 and may be a virtual light source that is set by the electronic device 100. The light source 310 may be displayed on the display 110 or may function only as a reference for setting the direction in which the plurality of second objects overlap each other and are displayed and may not be displayed on the display 110.

In an embodiment of the present disclosure, the electronic device 100 may detect a light source through an illumination intensity sensor and the like, and may overlap the plurality of second objects 330 in a direction corresponding to the location of the detected light source to display the plurality of overlapping second objects 330.

In an embodiment of the present disclosure, the electronic device 100 may set a virtual light source, and may overlap the plurality of second objects 330 in a direction corresponding to the location of the set virtual light source to display the plurality of overlapping second objects 330. The virtual light source may be set based on the time information acquired by the electronic device 100. For example, the electronic device 100 may set a location of the light source based on the time information such that the location of the light source corresponds to the location of the sun according to the time. Accordingly, the electronic device 100 may change the location of the light source as time elapses and the electronic device 100 may overlap the plurality of second objects 330 in a direction corresponding to the location of the light source that has changed as time elapses to display the plurality of overlapping second objects 330. Accordingly, the electronic device 100 may change the direction of the shadow that is displayed due to the plurality of second objects 330 as time elapses.

In an embodiment of the present disclosure, the electronic device 100 may differently set the location of the light source according to one or more set widget screens. The processor 100 may overlap the plurality of second objects in different directions according to one or more widget screens by differently setting the location of the light source according to the one or more set widget screens.

Referring to FIG. 3, the first object 320 is a text of '5'. Furthermore, the plurality of second objects 330 may be a text of '5' in an achromatic color. Accordingly, the plurality of second objects may be objects that have the same shape as that of the first object but have a color different from that of the first object. The electronic device 100 may overlap the plurality of second objects 330 having the same shape as that of the first object but having a different color in a direction corresponding to the location of the light source 310. Furthermore, the electronic device 100 may display the first object 320 on the plurality of overlapping second objects 330. Furthermore, the electronic device 100 may display the plurality of overlapping second objects 330 such that the plurality of second objects 330 are recognized as the shadow of the first object 320.

Accordingly, the electronic device 100 may display the shadow of the first object 320 more realistically than when the shadow is simply displayed through an object obtained by projecting the first object 320, by overlapping the plurality of second objects 330 to display the plurality of overlapping second objects 330.

Figure 4:
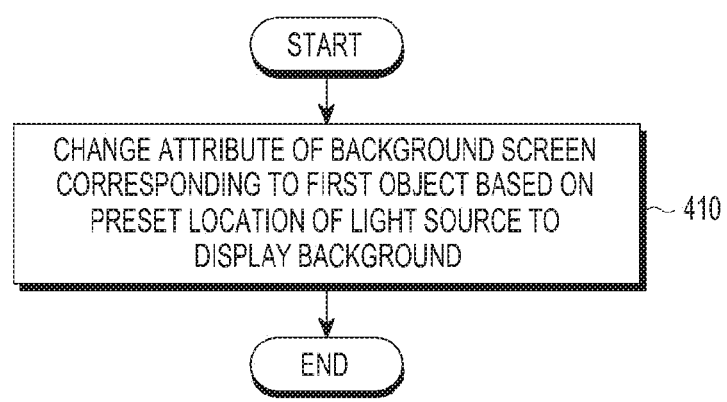
FIG. 4 is a flowchart of a method for changing an attribute of a background screen and displaying the changed attribute by an electronic device according to an embodiment of the present disclosure.

FIG. 4 is a flowchart of a method for changing an attribute of a background screen and displaying the changed attribute by an electronic device according to an embodiment of the present disclosure.

In step 410, the electronic device 100 changes the attribute of the background screen corresponding to the first object to display the background screen based on the location of the light source. Further, the electronic device 100 may change the attribute of the background screen such that the attribute of the background screen corresponds to time information used for setting the location of the light source, and may change the attribute of the background screen by using only the time information, without using the location of the light source.

For example, the electronic device 100 may change the attribute of the background screen in consideration of the relative location of the light source. Furthermore, the electronic device 100 may change the attribute of the background screen according to a time zone identified through the time information. In addition, the electronic device 100 may change the attribute of the background screen based on season information included in the date information.

Figure 5:
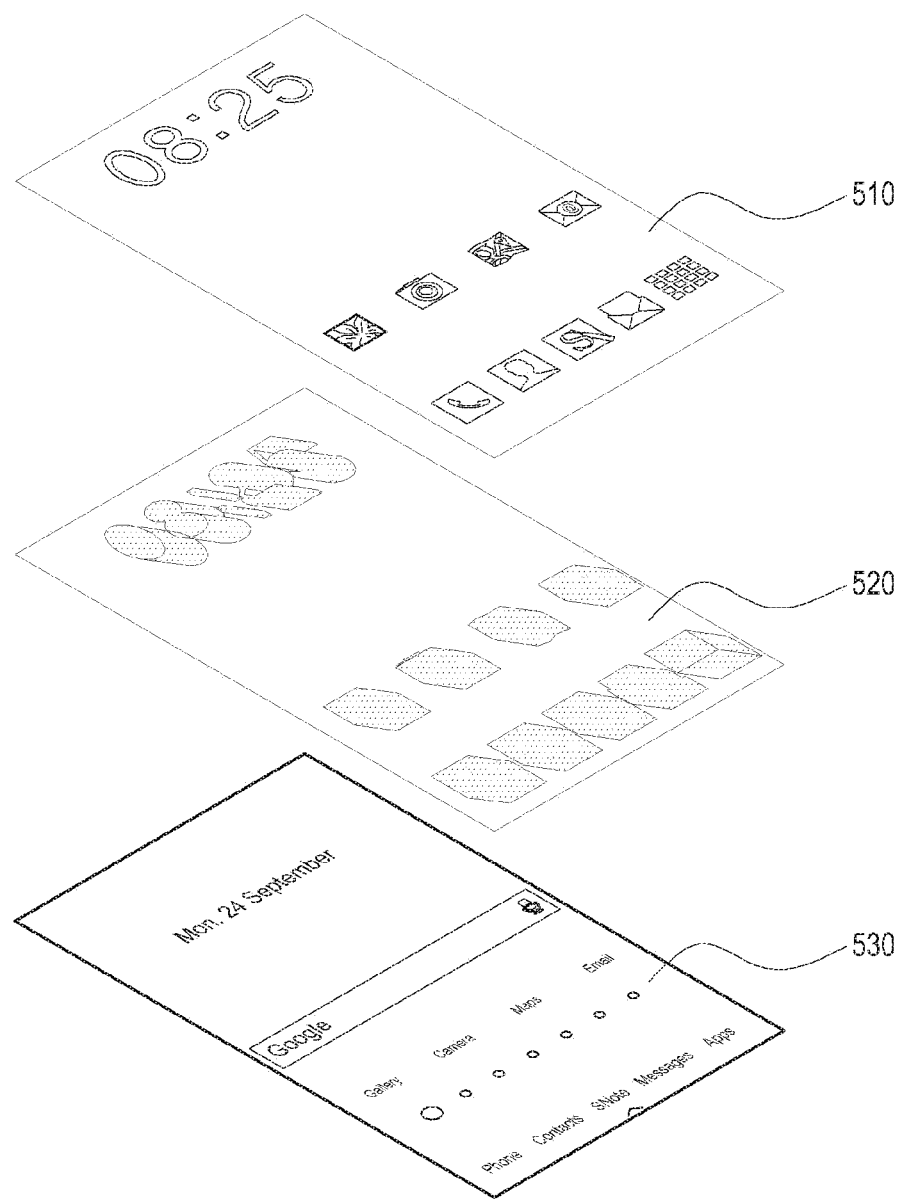
FIG. 5 is an exploded view illustrating layers used to display an object by an electronic device according to an embodiment of the present disclosure.

FIG. 5 is a view illustrating layers used to display an object by an electronic device according to an embodiment of the present disclosure.

In an embodiment of the present disclosure, the electronic device 100 may display the first object, the plurality of second objects and the background screen on different layers, and may combine the different layers to display the combined layers on the display 110.

For example, the first object is arranged on a first layer 510, the plurality of second objects are arranged on a second layer 520 and the background screen is arranged on a third layer 530. Accordingly, the electronic device 100 may change the attributes of the first object, the plurality of second objects and the background screen while not influencing the first object, the plurality of second objects and the background screen, by arranging the first object, the plurality of second objects and the background screen on different layers.

However, the method for classifying the layers into three layers 510, 520 and 530 as in FIG. 5 is an example for purpose of description and the present disclosure is not limited thereto. In order to display objects according to various embodiments of the present disclosure, two layers or one layer may be used. Similarly, a method for displaying an object, according to various embodiments of the present disclosure, may be applied by using four or more layers.

Figure 6A:
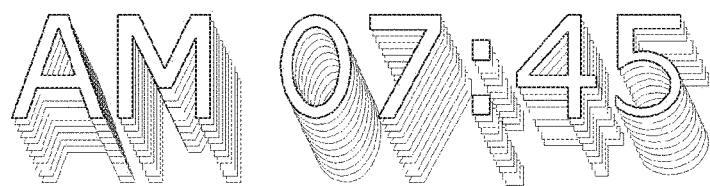
FIGS. 6A and 6B views illustrating a method for displaying an object in stages by an electronic device according to an embodiment of the present disclosure.
Figure 6B:
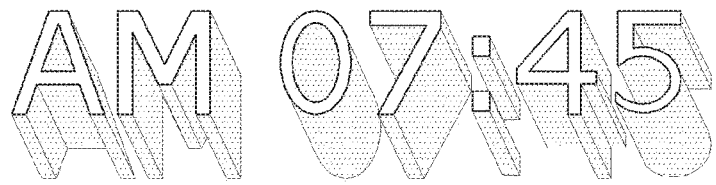

FIGS. 6A and 6B are views illustrating a method for displaying an object in stages by an electronic device according to an embodiment of the present disclosure.

As illustrated in FIG. 6A, the electronic device 100 overlaps a plurality of second objects obtained by changing the attribute of the first object to display the plurality of overlapping objects. The electronic device 100 may overlap the plurality of second objects at a predetermined interval and may gradually increase the interval as the number of the overlapping second objects increases such that the plurality of second objects overlap each other.

However, as illustrated in FIG. 6A, when the electronic device 100 has the same shape as that of the first object and overlaps the plurality of second objects, of which the colors are changed to achromatic colors, the borders of the plurality of overlapping second objects may not be as smooth as the actual shadow. For example, as illustrated in FIG. 6A, the borders of the plurality of overlapping second objects may be displayed in a stepped form by directly displaying the shapes of the plurality of second objects in areas where the plurality of second objects do not overlap each other.

Accordingly, the electronic device 100 may blur the plurality of overlapping second objects. As illustrated in FIG. 6B, the electronic device 100 may smooth the plurality of overlapping second objects to display the plurality of second objects without displaying the plurality of second objects such that the borders of the plurality of second objects are stepped. For example, the electronic device 100 may blur the plurality of overlapping second objects in a direction corresponding to the location of the light source. The electronic device 100 may display the shadow, which is displayed due to the plurality of overlapping second objects, more realistically by producing a blur in a direction corresponding to the location of the light source.

Figures 7A, 7B, 7C:
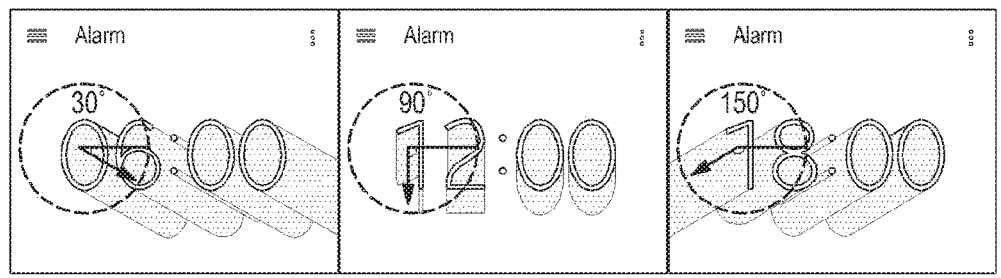
FIGS. 7A to 7C are views illustrating a method for setting a direction corresponding to the location of a light source and the number of second objects by an electronic device according to an embodiment of the present disclosure.

FIGS. 7A and 7C are views illustrating a method for setting a direction corresponding to the location of a light source and the number of second objects by an electronic device according to an embodiment of the present disclosure.

The electronic device 100 may set the location of the light source based on the acquired time information. Furthermore, the electronic device 100 may set the number of second objects based on the time information. Accordingly, the electronic device 100 may adjust the length of the shadow displayed due to the plurality of overlapping second objects.

For example, as illustrated in FIG. 7A, the electronic device 100 displays the time information on the display 110 and sets the location of the light source based on the time information. As illustrated in FIG. 7A, the electronic device 100 sets the location of the light source to a direction of 210°, based on the time information that is identified as 6:00 hour. Further, as illustrated in FIG. 7B, the electronic device 100 sets the location of the light source to a direction of 270° with respect to the first object, based on the time information that is identified as 12:00 hour. In addition, as illustrated in FIG. 7C, the electronic device 100 sets the location of the light source to a direction of 330°, based on the time information that is identified as 18:00 hour.

It is assumed that the angle for describing a direction corresponding to the location of the light source is set such that the right side of the center of the first object with respect to a virtual horizontal line passing through the center of the first object is 0°. However, the present disclosure is not limited thereto, but the location of the light source is set to correspond to the location of the sun according to the time, based on the time information.

In an embodiment of the present disclosure, the electronic device 100 may overlap the plurality of second objects in a direction corresponding to the location of the set light source. For example, the electronic device 100 may overlap the plurality of second objects in a direction (direction 180°) opposite the location of the light source. As illustrated in FIG. 7A, the electronic device 100 overlaps the plurality of second objects on direction 30°, which is a direction opposite to direction 210° corresponding to the location of the set light source. Further, as illustrated in FIG. 7B, the electronic device 100 overlaps the plurality of second objects in direction 90°, which is a direction opposite to direction 270° corresponding to the location of the light source and as illustrated in FIG. 7C, the electronic device 100 overlaps the plurality of second objects in direction 150°, which is a direction opposite to direction 330° corresponding to the location of the light source. Accordingly, the electronic device 100 may overlap the plurality of second objects in a direction opposite to the location of the light source, based on the principle in which an actual shadow is produced.

In an embodiment of the present disclosure, the electronic device 100 may determine a direction in which the plurality of second objects overlap each other based on the time information, without setting the location of the light source. For example, when the time information indicates 6:00 hour as illustrated in FIG. 7A, the electronic device 100 may overlap the plurality of second objects in direction 30° corresponding to the time information that indicates 6:00 hour. Further, when the time information indicates 12:00 hour as illustrated in FIG. 7B, the electronic device 100 may overlap the plurality of second objects in direction 90° corresponding to time information that indicates 12:00 hour, and when the time information indicates 18:00 hour as illustrated in FIG. 7C, the electronic device 100 may overlap the plurality of second objects in direction 150° corresponding to the time information that indicates 18:00 hour. The directions corresponding to time information in which the plurality of second objects overlap each other, may be set in advance and may be set based on the principle in which the shadows are produced by the sun at different times.

In an embodiment of the present disclosure, the electronic device 100 may set the number of the plurality of second objects based on the time information. For example, as illustrated in FIGS. 7A and 7C, the electronic device 100 may overlap and display 12 second objects and as illustrated in FIG. 7B, the electronic device 100 may overlap and display 6 second objects. The electronic device 100 may adjust the length of the shadow displayed due to the plurality of overlapping second objects by setting the number of second objects according to the location of the light source, based on the principle in which a shadow is actually produced. However, the number of overlapping second objects is an example for the purpose of description and the present disclosure is not limited thereto. Accordingly, the electronic device 100 may provide an effect in which the length of the shadow is seemingly changed by setting the number of overlapping second objects according to the location of the set light source.

Figure 8A:
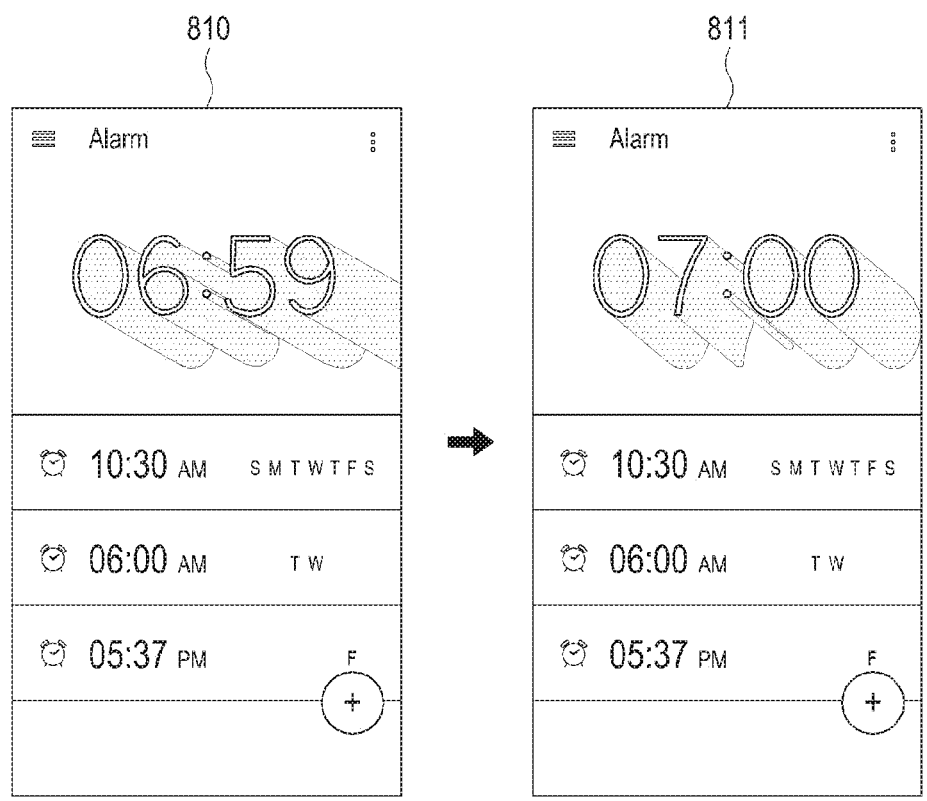
FIGS. 8A to 8C are screen views illustrating a method for setting a direction corresponding to the location of the light source and the number of second objects based on time information of an electronic device according to an embodiment of the present disclosure.
Figure 8B:
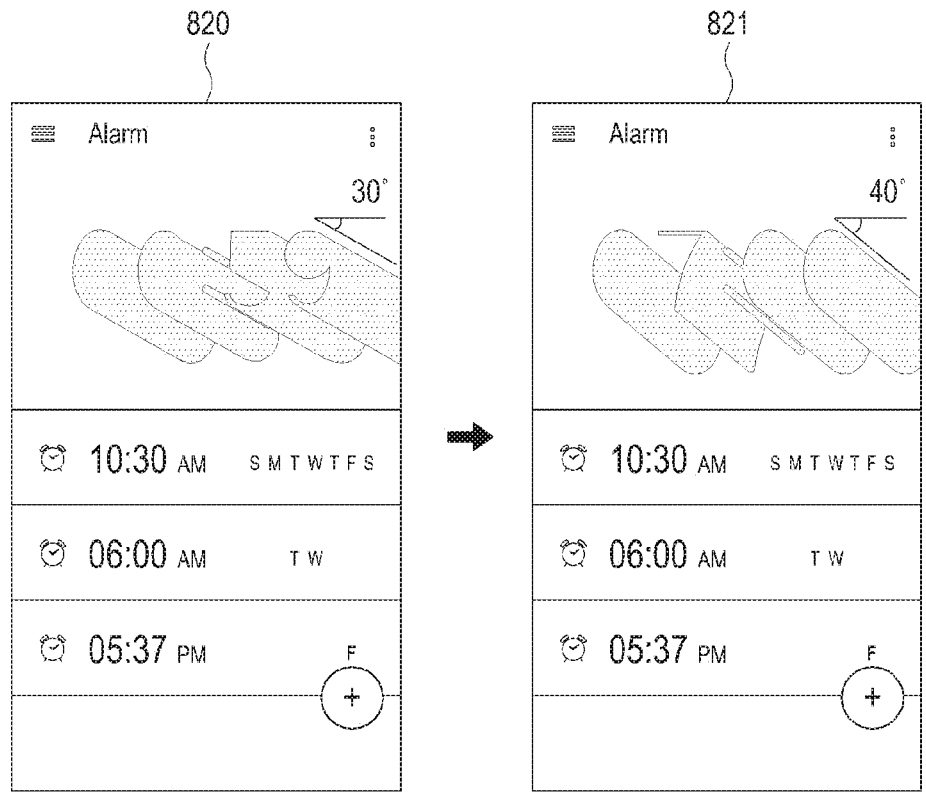
Figure 8C:
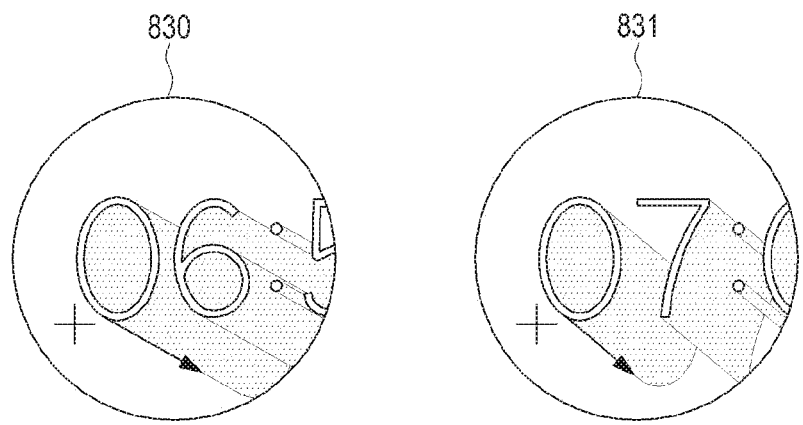
Figure 9D:
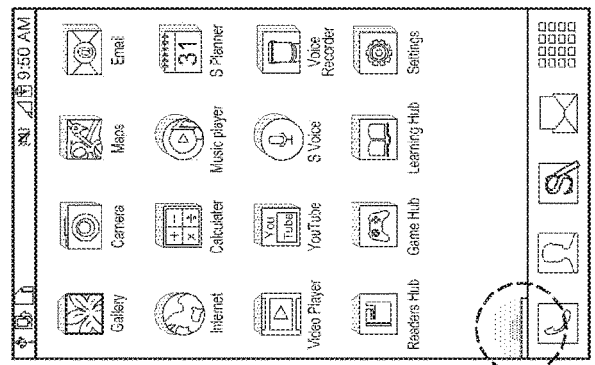
FIGS. 9A to 9D are views illustrating a method for differently displaying objects according to widget screens set by an electronic device according to an embodiment of the present disclosure.
Figure 9C:
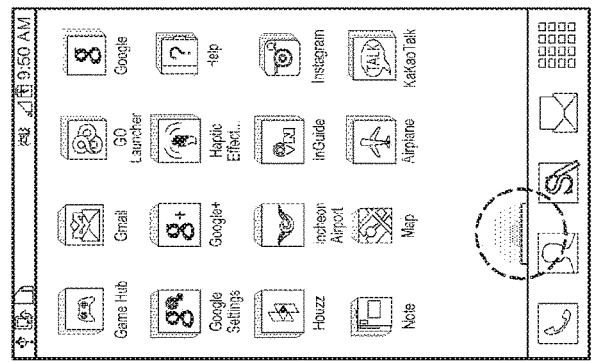
Figure 9B:
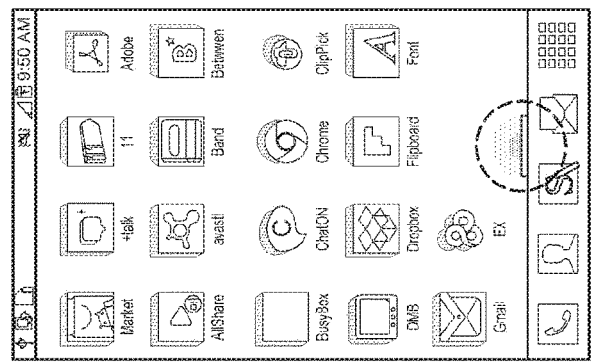
Figure 9A:
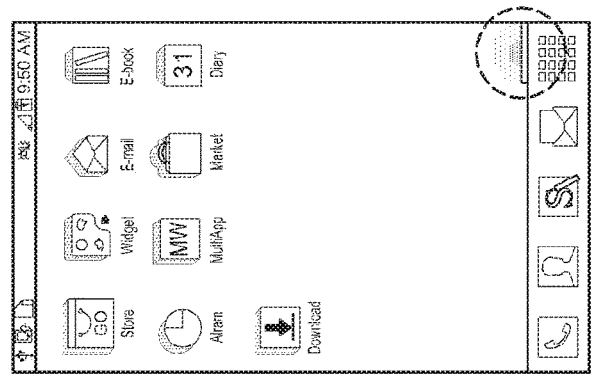

FIGS. 8A to 8C are views illustrating a method for setting a direction corresponding to a location of the light source and the number of the plurality of second objects based on time information of an electronic device according to an embodiment of the present disclosure.

In FIGS. 8A to 8C, a method for changing the location of the light source and the number of second objects at a time point when the time information changes from 6:59 to 7:00. As illustrated in FIG. 7, it is assumed that the angle for describing a direction corresponding to the location of the light source is set such that the right side of the center of the first object with respect to a virtual horizontal line passing through the center of the first object is 0°.

FIG. 8A illustrates a case in which the electronic device 100 displays all of the first object, the plurality of second objects and the background screen. As illustrated in FIG. 8A, the electronic device 100 displays the first object that indicates time information at a time point when the time information changes from 6:59 to 7:00 and displays the plurality of second objects obtained by changing the attribute of the first object and the background screen corresponding to the first object on the display 110. The electronic device 100 may change the location of the light source at a time point when the time information changes from 6:59 to 7:00 and may overlap the plurality of second objects in a direction corresponding to the changed location of the light source to display the plurality of overlapping second objects. Further, the number of second objects may be changed based on the changing time information.

FIG. 8B illustrates a screen that is displayed by using a second layer on which the plurality of second objects are arranged and a third layer on which the background screen is arranged, without using a first layer on which the first object is arranged, in order to describe a method for overlapping the plurality of second objects in a direction corresponding to the location of the light source changed according to the changing time information and the changed location of the light source to display the plurality of overlapping second objects. Further, although it will be described that the location of the light source is changed in a unit of 1 hour for the convenience of description, the present disclosure is not limited thereto and the location of the light source may be changed in any time unit.

As illustrated in FIG. 8A, the electronic device 100 sets the location of the light source to a direction of 210°, based on the time information that is identified as from 6:00 to 6:59. Further, the electronic device 100 sets the location of the light source to a direction of 220°, based on the time information that is identified from 7:00 to 7:59.

The electronic device 100 may overlap the plurality of second objects in a direction corresponding to the location of the set light source. For example, the electronic device 100 may overlap the plurality of second objects in direction 30°, which is a direction opposite to direction 210° corresponding to the set location of the light source, based on the time information identified as from 6:00 to 6:59. Further, the electronic device 100 may overlap the plurality of second objects in direction 40°, which is a direction opposite to direction 220° corresponding to the set location of the light source, based on the time information identified as from 7:00 to 7:59. Accordingly, the electronic device 100 may change the location of the light source as the time information changes and may overlap the plurality of second objects in a direction corresponding to the changed location of the light source.

Further the electronic device 100 may overlap the plurality of second objects in a direction corresponding to the acquired time information to display the plurality of overlapping second objects by using only the acquired time information, without using the location of the light source. For example, the electronic device 100 may overlap the plurality of second objects in direction 30° based on the time information identified as 6:00 to 6:59. The electronic device 100 may overlap the plurality of second objects in direction 40° based on the time information identified as 7:00 to 7:59. The direction corresponding to the time information may be set in advance by the electronic device 100 and the direction corresponding to the time information may be set in a direction that a shadow is produced corresponding to the location of the sun according to the time.

FIG. 8C is a view illustrating a method for changing the number of second objects according to the changing time information. In an embodiment of the present disclosure, the electronic device 100 may overlap 12 second objects based on the time information identified as 6:00 to 6:59 to display the overlapping second objects. Furthermore, the electronic device 100 may overlap 11 second objects based on the time information identified as 7:00 to 7:59. Accordingly, the electronic device 100 may adjust the length of the shadow expressed due to the plurality of overlapping second objects by setting the number of the plurality of second objects according to the location of the light source, based on the principle in which a shadow is actually produced. For example, when it is assumed that the length of the shadow expressed by one second object is 30 pixels, the length of the shadow may be displayed by 360 pixels by overlapping the twelve second objects to display the second objects. Further, the length of the shadow may be expressed by 330 pixels by overlapping 11 second objects to display the second objects. Accordingly, the electronic device 100 may provide an effect of changing the length of the shadow as the time information changes to display the shadow by setting the number of the plurality of overlapping second objects according to the time information.

FIGS. 9A to 9D are views illustrating a method for differently displaying objects according to widget screens set by an electronic device according to an embodiment of the present disclosure.

The electronic device 100 may differently set the location of the light source according to the one or more set widget screens. Further, the electronic device 100 may display the light source at the location of the light source set according to the widget screen. FIGS. 9A to 9D illustrate widget screens set by the electronic device 100, and light sources displayed at the locations of the light sources set according to the widget screens. The user may switch the widget screens through an input (for example, a touch input, a gesture input, or a pen input).

In FIGS. 9A to 9D, the first object displays icons included in the widget screens. A plurality of second objects may overlap each other in a direction corresponding to the locations of the light sources set according to the widget screens to be displayed. Accordingly, the electronic device 100 may display the shadow of the first object by overlapping and displaying the plurality of second objects.

Further, the electronic device 100 may change and display the location of the light source as the widget screens are switched by the user input. Accordingly, the user may recognize the switching of the widget screens through the change in the location of the light source. The direction of the shadow displayed due to the overlapping second objects may be changed according to the widget screens, by overlapping and displaying the plurality of second objects obtained by changing the attribute of the first object in a direction corresponding to the changed location of the light source.

Figure 10:
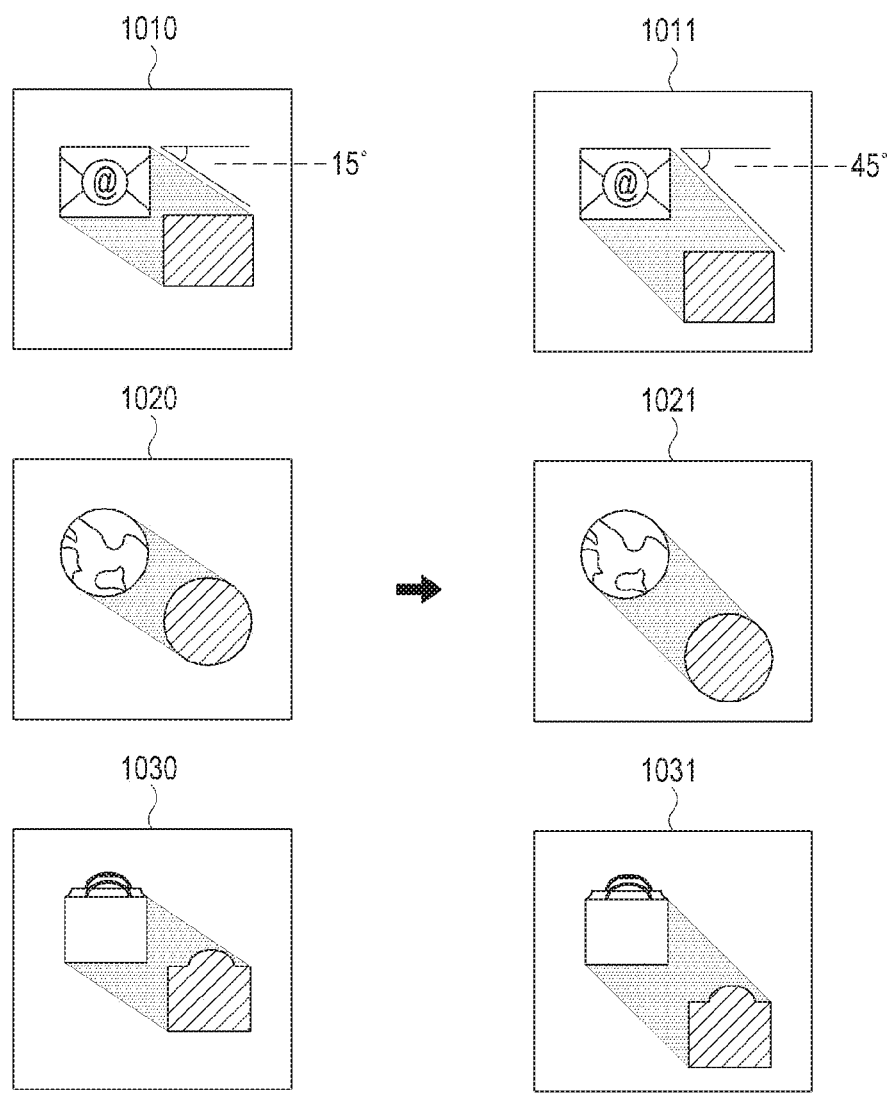
FIG. 10 is a view illustrating a method for overlapping a plurality of second objects by an electronic device according to an embodiment of the present disclosure.

FIG. 10 is a view illustrating a method for overlapping a plurality of second objects according to various first objects by an electronic device according to an embodiment of the present disclosure.

The plurality of second objects obtained by changing the attributes of the first objects 1010, 1020 and 1030 may overlap each other in direction 15° according to the locations of the light sources to be displayed. The plurality of second objects obtained by changing the attributes of the first objects 1011, 1021 and 1031 may overlap each other in direction 45° according to the locations of the light sources to be displayed.

The first objects 1010 and 1011 display a rectangular shape. In this case, the plurality of second objects obtained by changing the attributes of the first objects 1010 and 1011 may have the same rectangular shape as those of the first objects 1010 and 1011 and may be objects obtained by changing the color of the first objects 1010 and 1011 to an achromatic color. The plurality of second objects may overlap each other to be displayed and the shadows of the first objects 1010 and 1011 may be expressed due to the plurality of second objects.

The first objects 1020 and 1021 displays a circular shape. In this case, the plurality of second objects obtained by changing the attributes of the first objects 1020 and 1021 may have the same circular shape as those of the first objects 1020 and 1021 and may be objects obtained by changing the color of the first objects 1020 and 1021 to an achromatic color. The plurality of second objects may overlap each other to be displayed and the shadows of the first objects 1020 and 1021 may be expressed due to the plurality of second objects.

The first objects 1030 and 1031 display a customized shape. In this case, the plurality of second objects obtained by changing the attributes of the first objects 1030 and 1031 may have the same customized shape as those of the first objects 1030 and 1031 and may be objects obtained by changing the color of the first objects 1030 and 1031 to an achromatic color. The plurality of second objects may overlap each other to be displayed and the shadows of the first objects 1030 and 1031 may be expressed due to the plurality of overlapping second objects.

As described above, the electronic device 100 may display a shape corresponding to the shape of the first object and a plurality of second objects having the same shape and by changing the color of the first object to an achromatic color, the first object and the second objects may overlap each other to be displayed. The electronic device 100 may display the shadow of the first object on the display 110 due to the plurality of overlapping second objects.

Figure 11:
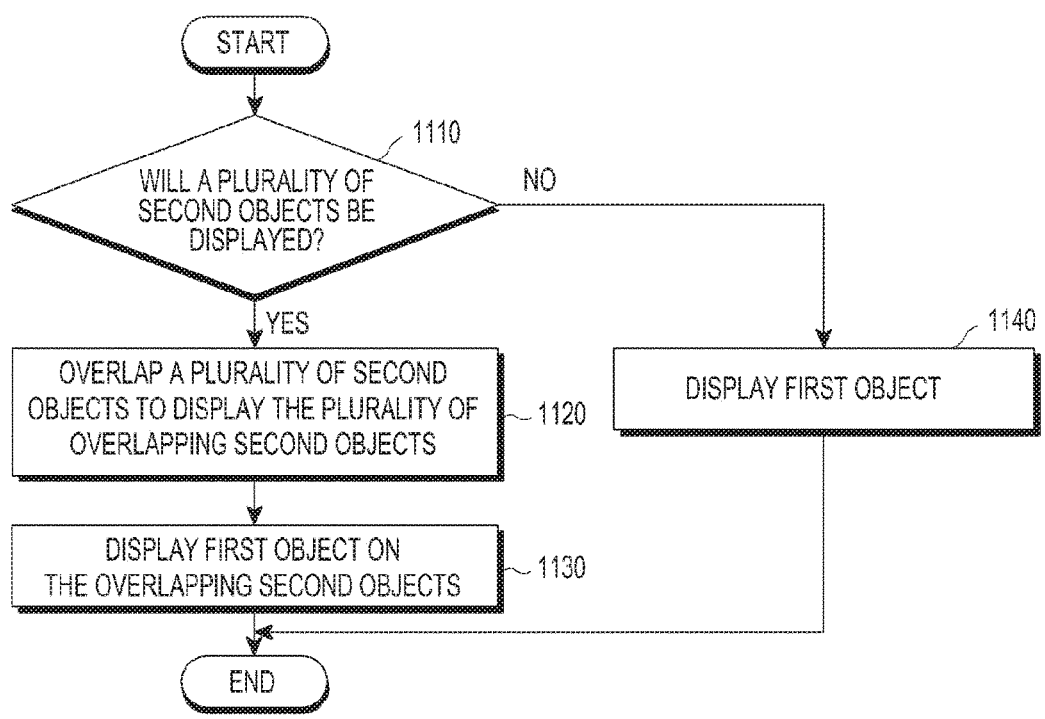
FIG. 11 is a flowchart of a method for determining whether a plurality of second objects are displayed according to an embodiment of the present disclosure.

FIG. 11 is a flowchart of a method for determining whether a plurality of second objects are displayed according to an embodiment of the present disclosure.

In step 1110, the electronic device 100 determines whether the plurality of second objects obtained by changing the attribute of the first object will be displayed. For example, the electronic device 100 may be set such that the plurality of second objects only for a preset time zone or a specific first object may overlap each other to be displayed. In this case, the electronic device 100 may perform a process of determining whether the plurality of second objects will be displayed.

In step 1120, when it is determined that the plurality of second objects will be displayed, the electronic device 100 overlaps the plurality of objects in a direction corresponding to the location of the light source to display the plurality of overlapping objects.

In step 1130, the electronic device 100 displays the first object on the plurality of overlapping second objects. The electronic device 100 displays a shadow effect for the first object by displaying the first object on the overlapping second objects.

In step 1140, when it is determined that the plurality of second objects are not displayed, the electronic device 100 displays only the first object. For example, when the acquired time information indicates a nighttime zone (for example, 17:00 to 05:00 of the next day) or an application corresponding to the first object is not executed, the electronic device 100 may display only the first object without displaying the plurality of second objects.

Figure 12A:
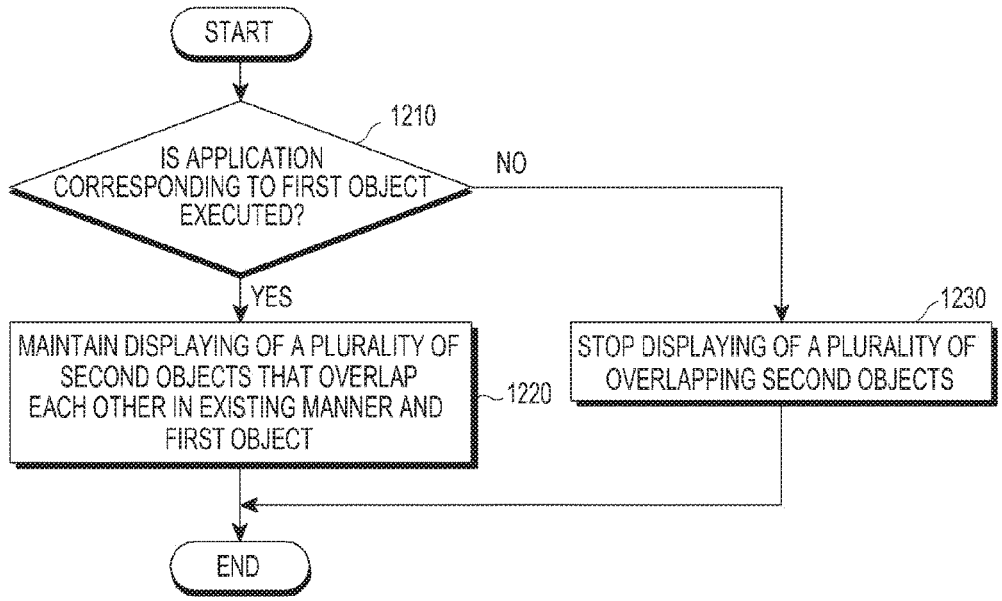
FIGS. 12A and 12B are flowcharts of a method for stopping the displaying of overlapping second objects by an electronic device according to an embodiment of the present disclosure.
Figure 12B:
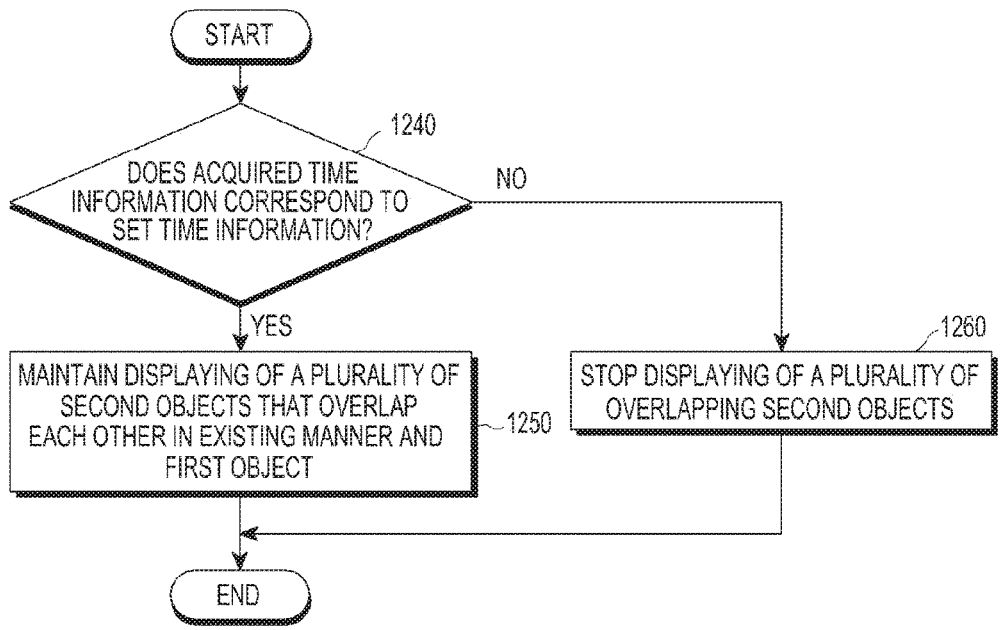

FIGS. 12A and 12B are flowcharts of a method for stopping the plurality of overlapping second objects while the electronic device 100 displays the plurality of second objects obtained by changing the attribute of the first object.

In step 1210, the electronic device 100 determines whether an application corresponding to the first object will be executed. When an application corresponding to the first object is executed, the electronic device 100 overlaps the plurality of second objects to display the plurality of overlapping second objects.

In step 1220, when an application corresponding to the first object is executed, the electronic device 100 maintains the displaying of the plurality of second objects that overlap each other and the first object.

In step 1230, the electronic device 100 stops the displaying of the plurality of overlapping second objects. The electronic device 100 allows the user to recognize whether an application corresponding to the first object will be executed, by stopping displaying of the plurality of second objects.

In step 1240, the electronic device 100 identifies whether the acquired time information corresponds to time information set such that the plurality of second applications are not displayed. For example, when the acquired time information corresponds to a nighttime zone (for example, 17:00 to 05:00 of the next day), the electronic device 100 may not display the plurality of second objects.

In step 1250, when the acquired time information does not correspond to the set time information, the electronic device 100 maintains the displaying of the plurality of second objects that overlap each other and the first object.

In step 1260, when the acquired time information corresponds to the set time information, the electronic device 100 stops the displaying of the plurality of second objects that overlap each other and the first object. The electronic device 100 may provide the user with a more realistic shadow effect by stopping displaying of the plurality of overlapping second objects according to the acquired time information.

Figure 13:
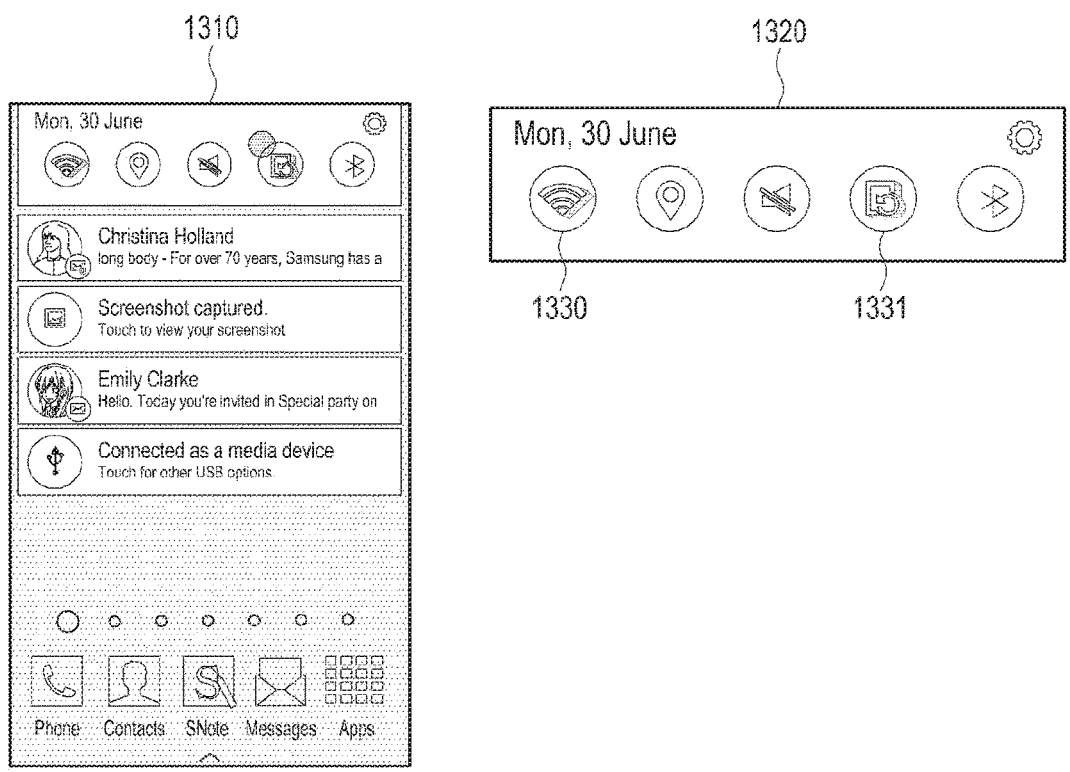
FIG. 13 is a view illustrating a method for stopping the displaying of the overlapping second objects based on execution of an application by an electronic device according to an embodiment of the present disclosure.

FIG. 13 is a view illustrating a method for stopping the displaying of the overlapping second objects based on execution of an application by an electronic device according to an embodiment of the present disclosure.

FIG. 13 illustrates a quick panel 1310 and icons 1320 included in the quick panel screen 1310. The first object displays the icons 1320. The electronic device 100 may determine whether applications corresponding to the icons 1320 are executed or activated. The electronic device 100 may overlap the plurality of second objects obtained by changing the attribute of the first object that expresses icons corresponding to the executed or activated applications and may display the plurality of overlapping second objects.

For example, when applications corresponding to a Wi-Fi icon 1330 and an automatic screen rotation icon 1331 are activated or executed, the electronic device 100 may overlap the plurality of second objects obtained by changing the first objects that display the Wi-Fi icon 1330 and the automatic screen rotation icon 1331 to display the plurality of overlapping second objects. The electronic device 100 may not overlap the plurality of second objects for the remaining icons except for the Wi-Fi icon 1330 and the automatic screen rotation icon 1331 of the icons 1320 included in the quick panel screen 1310.

Furthermore, when the execution of the application corresponding to the Wi-Fi icon 1330 is stopped or deactivated, the electronic device 100 may stop the displaying of the plurality of second objects that are being displayed for the Wi-Fi icon 1330.

Figure 14:
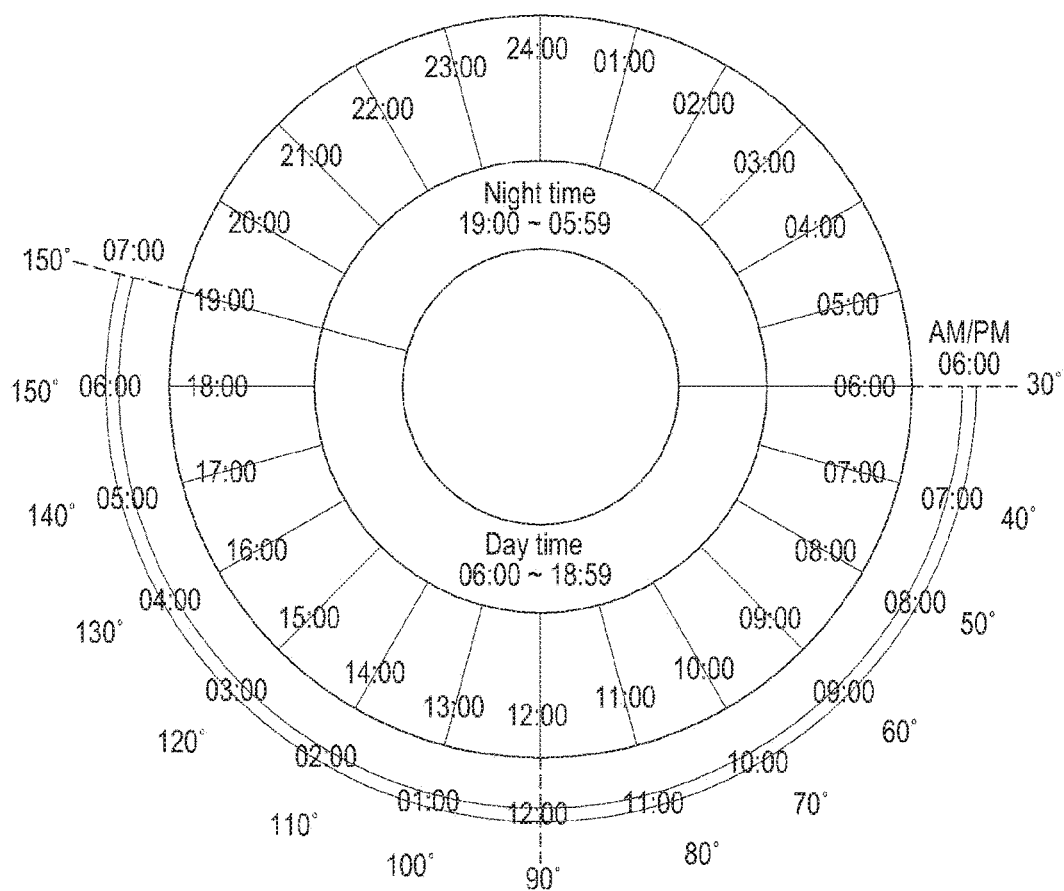
FIG. 14 is a diagram illustrating a method for stopping the displaying of overlapping second objects based on time information by an electronic device according to an embodiment of the present disclosure.

FIG. 14 is a diagram illustrating a method for stopping the displaying of overlapping second objects based on time information by an electronic device according to an embodiment of the present disclosure.

As illustrated in FIG. 14, the location of the light source and whether the plurality of second objects will be displayed may be set according to time information. For example, the location of the light source may be set to be changed in units of 1 hour, and may be set in the manner described with reference to FIGS. 7 and 8.

Furthermore, it may be set in a daytime zone (for example, 6:00 to 18:59) such that the plurality of second objects are displayed and it may be set in a nighttime zone (for example, 19:00 to 5:59 of the next day) such that the plurality of second objects are not displayed.

The setting of the time information illustrated in FIG. 14 is an example for the purpose of description and the present disclosure is not limited thereto. The setting of the time information may be set differently by the user according to season information or weather information and may be automatically changed by using the season information or the weather information acquired by the electronic device 100.

In an embodiment of the present disclosure, the electronic device 100 may determine the location of the light source and whether the plurality of second objects will be displayed, by comparing the acquired time information and the set time information.

FIG. 15A to 15C are views illustrating a method for displaying an object in a screen conversion process by an electronic device according to an embodiment of the present disclosure.

As illustrated in FIGS. 15A to 15C, one or more home screens may be displayed based on a user input (for example, a touch input, a gesture input, or a pen input). The first object may display the entire home screen. In this case, the electronic device 100 may overlap the plurality of second objects obtained by changing the attribute of the first object that displays the entire home screen and displays the plurality of overlapping second objects. Accordingly, the electronic device 100 may display the shadow of the entire home screen through the overlapping second objects.

In an embodiment of the present disclosure, the electronic device 100 may overlap the plurality of second objects such that the plurality of second objects correspond to a direction in which the home screen moves. For example, as illustrated in FIG. 15A, when the first home screen is moved leftwards in correspondence to an input of the user, the electronic device 100 may overlap the plurality of second objects in the right direction that is opposite to the left direction, that is, the movement direction of the first home screen to display the plurality of second objects.

Further, as illustrated in FIG. 15B, when the second home screen is moved rightwards in correspondence to an input of the user, the electronic device 100 may overlap the plurality of second objects in the left direction that is opposite to the right direction, that is, the movement direction of the second home screen to display the plurality of second objects.

In addition, as illustrated in FIG. 15C, the electronic device 100 may display the shadow of the third home screen through the overlapping second objects even while the third home screen is not being switched and only displayed.

FIGS. 16A to 16D are views illustrating a method for displaying an object in a home folder by an electronic device according to an embodiment of the present disclosure.

As illustrated in FIGS. 16A to 16D, the home folder may include one or more icons corresponding to applications frequently used by the user of the electronic device 100. When the electronic device 100 displays the home folder icons 1610, 1620, 1630, and 1640 and the user selects the home folder icons 1610, 1620, 1630 and 1640, the electronic device 100 displays one or more icons included in the home folder.

In this case, the electronic device 100 sets the location of the light source according to the locations of the home folder icons 1610, 1620, 1630 and 1640. The detailed method for setting the location of the light source is the same as the method described with reference to FIGS. 7 and 8.

Figure 16A:
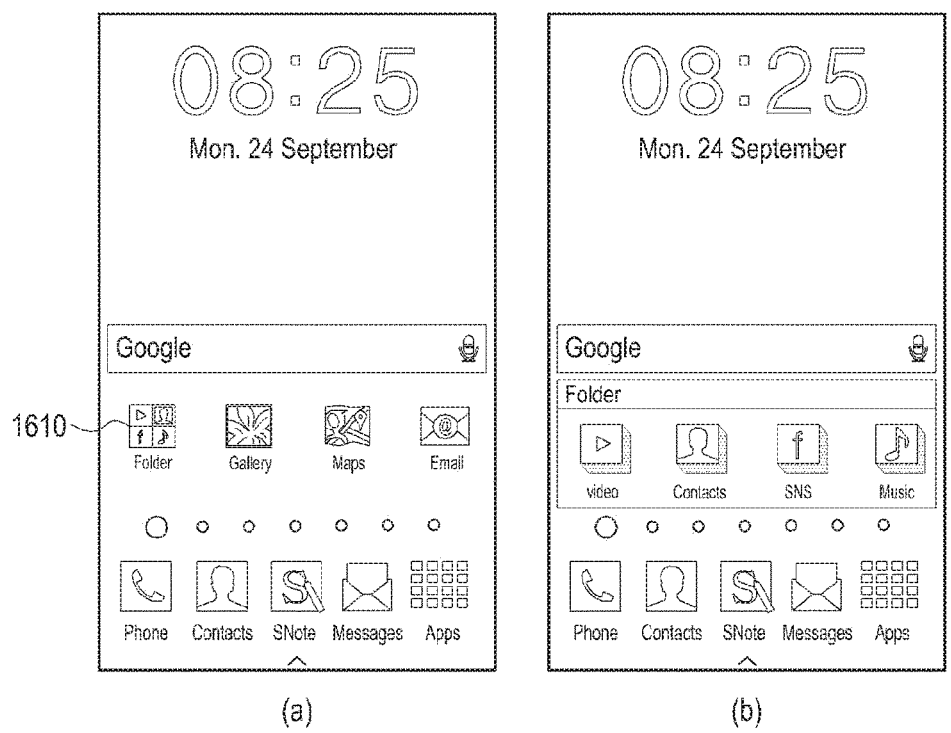

For example, when the home folder icon 1610 is situated at a first location as illustrated in FIG. 16A(a), the location of the light source may be set to 210°. When the user selects the home folder icon 1610, the electronic device 100 overlaps the plurality of second objects for one or more icons included in the home folder in a direction corresponding to the location of the light source as illustrated in FIG. 16A(b) to display the plurality of overlapping second objects.

Figure 16B:
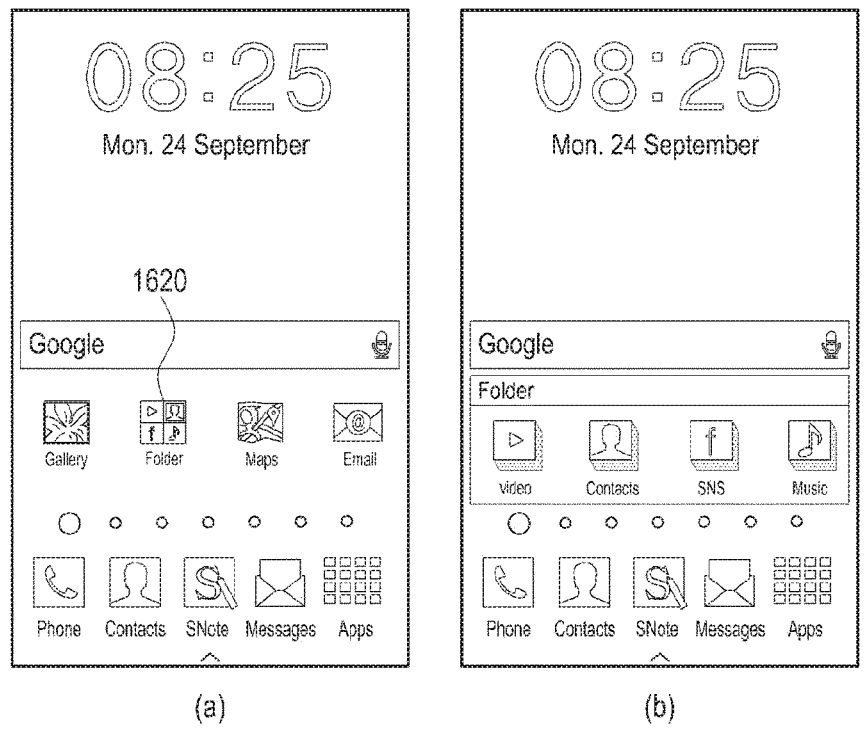

When the home folder icon 1620 is situated at a second location that is on the right side of the first location as illustrated in FIG. 16B(a), the location of the light source may be set to 240°. When the user selects the home folder icon 1620, the electronic device 100 overlaps the plurality of second objects for one or more icons included in the home folder in a direction corresponding to the location of the light source as illustrated in FIG. 16B(b) to display the plurality of overlapping second objects.

When the home folder icon 1630 is situated at a third location that is on the right side of the second location as illustrated in FIG. 16C(a), the location of the light source may be set to 300°. When the user selects the home folder icon 1630, the electronic device 100 overlaps the plurality of second objects for one or more icons included in the home folder in a direction corresponding to the location of the light source as illustrated in FIG. 16C(b) to display the plurality of overlapping second objects.

When the home folder icon 1640 is situated at a fourth location that is on the right side of the third location as illustrated in FIG. 16D(a), the location of the light source may be set to 330°. When the user selects the home folder icon 1640, the electronic device 100 overlaps the plurality of second objects for one or more icons included in the home folder in a direction corresponding to the location of the light source as illustrated in FIG. 16D(b) to display the plurality of overlapping second objects.

As described above, the electronic device 100 sets the location of the light source according to the locations of the home folder icons 1610, 1620, 1630 and 1640, and overlaps the plurality of objects for one or more icons included in the home folder in a direction corresponding to the set location of the light source to display the plurality of overlapping second objects.

In an embodiment of the present disclosure, the electronic device 100 may overlap the plurality of objects for one or more icons included in the home folder in a preset direction according to the home folder icons 1610, 1620, 1630 and 1640 to display the plurality of overlapping second objects.

As described above, the electronic device 100 may set a light source according to the locations of the home folder icons 1610, 1620, 1630, and 1640, and may overlap the plurality of second objects for one or more icons included in the home folder in a preset direction according to the locations of the home folder icons 1610, 1620, 1630 and 1640 without a process of setting the light source to display the plurality of overlapping second objects.

Figure 17:
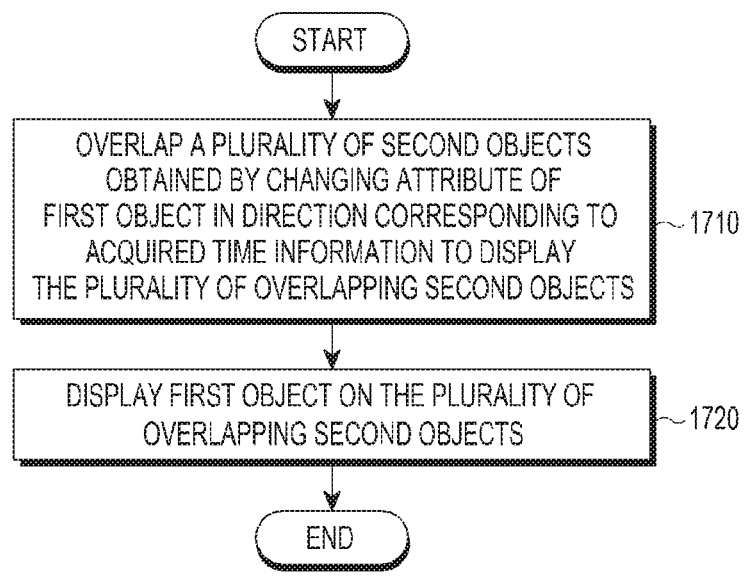
FIG. 17 is a flowchart illustrating a method for displaying an object by an electronic device according to various embodiments of the present disclosure.

FIG. 17 is a flowchart illustrating a method for displaying an object by an electronic device according to various embodiments of the present disclosure.

In step 1710, the electronic device 100 overlaps the plurality of second objects obtained by changing the attribute of the first object in one direction corresponding to the acquired time information and displays the plurality of overlapping second objects. The electronic device may overlap the plurality of second objects by using only the acquired time information without setting the location of the light source to display the plurality of overlapping second objects.

In step 1720, the electronic device 100 displays the first object on the plurality of overlapping second objects. Accordingly, the electronic device 100 may display the shadow of the first object through the overlapping second objects according to the acquired time.

Each of the components of the electronic device according to an embodiment of the present disclosure may be implemented by one or more components and the name of the corresponding component may vary depending on the type of electronic device. In various embodiments, the electronic device may include at least one of the above-described elements. Some of the above-described elements may be omitted from the electronic device or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, refer to a unit including one of hardware, software and firmware or a combination of two or more. The term "module" may be interchangeably used with, for example, the terms "unit", "logic", "logical block", "component" or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present disclosure may include at least one of an Application-Specific Integrated Circuit (ASIC) chip, a Field-Programmable Gate Array (FPGA) and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory) and the like. In addition, the program instructions may include high level language codes, which can be executed in a computer by using an interpreter, as well as machine codes made by a compiler. The aforementioned hardware device may be configured to operate as one or more software modules in order to perform the operation of the present disclosure and vice versa.

The programming module according to the present disclosure may include one or more of the aforementioned components or may further include other additional components or some of the aforementioned components may be omitted. Operations executed by a module, a programming module, or other component elements according to various embodiments of the present disclosure may be executed sequentially, in parallel, repeatedly or in a heuristic manner. Further, some operations may be executed according to another order or may be omitted or other operations may be added.

According to various embodiments of the present disclosure, a storage medium that stores instructions, wherein the instructions are set to allow at least one processor to perform at least one process when the instructions are executed by the one or more processors, the one or more processes including overlapping a plurality of second objects obtained by changing an attribute of a first object in a direction corresponding to a location of a light source to display the plurality of overlapping second objects and displaying the first object on the plurality of overlapping second objects.

Various embodiments disclosed herein are provided merely to describe technical details of the present disclosure and to help the understanding of the present disclosure and do not limit the scope of the present disclosure. It should be construed that all modifications and changes or modified and changed forms based on the technical idea of the present disclosure fall within the scope of the present disclosure. Therefore, the scope of the present disclosure should not be defined as being limited to the embodiments, but should be defined by the appended claims and equivalents thereof.

What is claimed is:

1. A method for displaying an object by an electronic device, the method comprising:
   determining a location of a light source based on a location of an external light source sensed by an illumination intensity sensor of the electronic device;
   generating a plurality of second objects obtained by changing an attribute of a first object;
   displaying the plurality of second objects by overlapping the plurality of second objects with each other in a direction corresponding to the determined location of the light source; and
   displaying the first object on the plurality of second objects overlapping each other.

2. The method of claim 1, wherein the plurality of second objects are obtained by changing a color of the first object.

3. The method of claim 1, further comprising:
   changing the location of the light source based on acquired time information; and
   determining a number of the plurality of second objects based on the acquired time information.

4. The method of claim 1, further comprising:
   changing the location of the light source according to a widget screen displayed on a display of the electronic device.

5. The method of claim 1, wherein the plurality of second objects overlapping each other are blurred based on the direction corresponding to the determined location of the light source.

6. The method of claim 1, wherein overlapping the plurality of second objects in the direction corresponding to the determined location of the light source comprises:
   changing an attribute of each of the plurality of second objects based on distances between the first object and each of the plurality of second objects,
   wherein the changed attribute of each of the plurality of second objects is different from each other.

7. The method of claim 1, further comprising:
   changing a brightness of a background screen corresponding to the first object based on the determined location of the light source.

8. The method of claim 1, further comprising:
   when an acquired time information corresponds to time information set such that the plurality of second objects are not to be displayed, stopping the display of the plurality of second objects on the display.

9. The method of claim 1, further comprising:
   when execution of an application corresponding to the first object is stopped, stopping the display of the plurality of second objects overlapping each other on a display of the electronic device.

10. An electronic device comprising:
    a display;
    an illumination intensity sensor configured to sense an external light source; and
    a processor configured to:
    determine a location of a light source based on a location of the external light source sensed by the illumination intensity sensor,
    generate a plurality of second obtained by changing an attribute of a first object,
    display the plurality of second objects by overlapping the plurality of second objects with each other in a direction corresponding to the determined location of the light source, and
    display the first object on the plurality of second objects overlapping each other.

11. The electronic device of claim 10, wherein the plurality of second objects are obtained by changing a color of the first object.

12. The electronic device of claim 10, wherein the processor is further configured to:
    change the location of the light source based on acquired time information; and
    determine a number of the plurality of second objects based on the acquired time information.

13. The electronic device of claim 10, wherein the processor is further configured to:
    change the location of the light source according to a widget screen displayed on the display.

14. The electronic device of claim 10, wherein the plurality of second objects overlapping each other are blurred based on the direction corresponding to the determined location of the light source.

15. The electronic device of claim 10, wherein the processor is further configured to:
    change an attribute of each of the plurality of second objects based on the distances between the first object and each of the plurality of second objects,
    wherein the changed attribute of each of the plurality of second objects is different from each other.

16. The electronic device of claim 10, wherein the processor is further configured to:
    change brightness of a background screen corresponding to the first object based on the determined location of the light source.

17. The electronic device of claim 10, wherein, when acquired time information corresponds to time information set such that the plurality of second objects are not to be displayed, the processor is further configured to stop displaying the plurality of second objects overlapping each other on the display.

18. The electronic device of claim 10, wherein, when execution of an application corresponding to the first object is stopped, the processor is further configured to stop displaying the plurality of second objects overlapping each other on the display.

* * * * *